US008273811B2

(12) United States Patent
Tsujimoto et al.

(10) Patent No.: US 8,273,811 B2
(45) Date of Patent: Sep. 25, 2012

(54) COATING MATERIAL COMPOSITE AND COATED ARTICLE

(75) Inventors: Akira Tsujimoto, Ikoma (JP); Ryozo Fukuzaki, Kobe (JP); Takeyuki Yamaki, Nara (JP); Hiroshi Yokogawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 11/816,832

(22) PCT Filed: Feb. 28, 2006

(86) PCT No.: PCT/JP2006/303767
§ 371 (c)(1),
(2), (4) Date: Aug. 22, 2007

(87) PCT Pub. No.: WO2006/093156
PCT Pub. Date: Sep. 8, 2006

(65) Prior Publication Data
US 2009/0043025 A1 Feb. 12, 2009

(30) Foreign Application Priority Data
Mar. 2, 2005 (JP) .................................. 2005-058184

(51) Int. Cl.
C08K 5/15 (2006.01)
C08G 77/04 (2006.01)
C08G 77/60 (2006.01)
C08G 77/24 (2006.01)

(52) U.S. Cl. .............. 524/109; 528/42; 528/34; 528/35; 528/36

(58) Field of Classification Search .................. 524/263, 524/109; 528/34, 35, 36, 42; 32/263
See application file for complete search history.

(56) References Cited

U.S. PATENT DOCUMENTS

| | | | | |
|---|---|---|---|---|
| 5,958,514 | A | * | 9/1999 | Havey et al. .................. 427/386 |
| 6,348,269 | B1 | * | 2/2002 | Terry ............................ 428/447 |
| 6,572,973 | B1 | | 6/2003 | Taruishi et al. |
| 2004/0125169 | A1 | * | 7/2004 | Nakagawa et al. ............. 347/45 |
| 2004/0209084 | A1 | * | 10/2004 | Yamaya et al. ............... 428/421 |
| 2006/0240268 | A1 | | 10/2006 | Yamaya et al. |
| 2007/0155897 | A1 | | 7/2007 | Tani et al. |

FOREIGN PATENT DOCUMENTS

| | | |
|---|---|---|
| EP | 1471120 | 10/2004 |
| JP | 58-222160 | 12/1983 |
| JP | 59-043070 | 3/1984 |
| JP | 59-115840 | 7/1984 |
| JP | 60-262833 | 12/1985 |
| JP | 61-10043 | 1/1986 |
| JP | 61-275343 | 12/1986 |
| JP | 61-276832 | 12/1986 |
| JP | 62-275174 | 11/1987 |
| JP | 1-24422 | 5/1989 |
| JP | 1-2755130 | 11/1989 |
| JP | 4-341379 | 11/1992 |
| JP | 4-343366 | 11/1992 |
| JP | 6-16940 | 1/1994 |
| JP | 6-25599 | 2/1994 |
| JP | 06025599 A | * 2/1994 |
| JP | 6-29332 | 4/1994 |
| JP | 6-347605 | 12/1994 |
| JP | 8-311408 | 11/1996 |
| JP | 2629813 | 4/1997 |
| JP | 2001-194505 | 7/2001 |
| JP | 2002-53805 | 2/2002 |
| JP | 2002-543235 | 12/2002 |
| JP | 2004-315712 | 11/2004 |
| WO | 00/64992 | 11/2000 |
| WO | 01/98222 | 12/2001 |
| WO | 2005/059051 | 6/2005 |

OTHER PUBLICATIONS

Extended European Search Report that issued with respect to European Patent Application No. 06714896.5, mailed Jul. 1, 2010.
E.P.O. Office action that issued with respect to patent family member European Patent Application No. 06714896.5, mail date is Jul. 19, 2011.
Japan Office action that issued with respect to patent family member Japanese Patent Application No. 2007-505961, mail date is Feb. 22, 2011.
English language abstract of JP 6-347605.
English language abstract of JP 6-25599.
English language abstract of JP 6-29332.
English language abstract of JP 2002-53805.
English language abstract of JP 2629813.
English language abstract of JP 2004-315712.
Japan Office action that issued with respect to patent family member Japanese Patent Applicatipon No. 2007-505961, mail date is Feb. 14, 2012.

* cited by examiner

*Primary Examiner* — William Cheung
(74) *Attorney, Agent, or Firm* — Greenblum & Bernstein, P.L.C.

(57) ABSTRACT

A coating material composite, comprising containing: a silane compound represented by the general formula (A); and an epoxy group-containing organic compound containing one or more epoxy groups in each molecule; wherein the silane compound has a content of 60 to 97% by weight relative to a total amount of resin components; and wherein the epoxy group-containing organic compound has a content of 3 to 10% by weight relative to the total amount of resin components;

$$X_m R^1{}_{3-m}Si\text{—}Y\text{—}SiR^1{}_{3-m}X_m \quad (A)$$

[R1 is a monovalent hydrocarbon group having a carbon number of 1 to 6; Y is a divalent organic group containing one or more fluorine atoms; X is a hydrolytic group; and m is an integer of 1 to 3]. The coating formed by such a coating material composite is capable of keeping a higher anticrack property even upon exposure to high-temperature.

8 Claims, No Drawings

COATING MATERIAL COMPOSITE AND COATED ARTICLE

TECHNICAL FIELD

The present invention relates to a coating material composite having a lower refractive index and capable of realizing higher antiscratching property, antifouling property, chemical resistance, and anticrack property, and to a coated article formed with a cured coating derived from the coating material composite.

BACKGROUND ART

As coating material composites, chemically resistant fluororesins have been mainly used for applications requiring chemical resistances. Further, fluororesins have also been utilized in antireflective applications in displays and the like, taking advantage of lower refractive indexes inherently possessed by the fluororesins. Note that, although fluororesins have been utilized as rubbers or coating agents, it has been difficult to attain a protective coating agent which is hard and excellent in antiscratching property, due to molecular structures of the fluororesins.

Meanwhile, there have been recently developed hydrolytic silane compounds having perfluoro-alkyl groups, as well as various coating agents which are water repellent, oil repellent, antifouling, antireflective, and the like, by taking advantage of the properties of the hydrolytic silane compounds, respectively. However, since perfluoro-alkyl groups for bringing about the properties are bulky and inactive, crosslinking densities of cured coatings are lowered. As a result, although the cured coatings are made appreciably hard as compared to fluororesins, the cured coatings are still insufficient in antiscratching property.

Further, the following have been developed for the purpose of improving antiscratching properties.

Firstly, (1) there has been developed a scheme to co-hydrolyze perfluoro-alkyl group containing silanes, and various silane compounds such as tetraalkoxysilanes, as disclosed in Japanese Patent Unexamined Publication No. 2002-53805.

Further, (2) there has been developed a system to use perfluoro-alkyl group containing silane together with: a disilane compound containing perfluoroalkylene as a spacer; and tetraalkoxysilane; as disclosed in Japanese Patent Examined Publication No. H6-29332.

Moreover, (3) there has been proposed a system to use a disilane compound containing perfluoroalkylene as a spacer; together with epoxyfunctional silane; as disclosed in Japanese Patent No. 2,629,813.

By virtue of these techniques, it has been made possible to ensure the intended antifouling property, antiscratching property, close contact property, and antireflection property, at relatively satisfactory levels, respectively. However, this has resulted in decreased fluorine content rates, in a manner to rather lead to insufficient chemical resistances, which have been essentially excellent, against chemical substances such as household detergents, and particularly lead to an insufficient alkali resistance which is particularly a weak point of polysiloxanes, thereby bringing about a practical problem.

On the other hand, Japanese Patent Unexamined Publication No. 2004-315712 has disclosed a composite which contains a disilane compound having a specific structure or contains a (partially) hydrolyzed product of the compound, thereby achieving a chemical resistance at a level higher than before. However, the disclosed composite has a problem that cracks are caused therein such as upon application of high heat to the composite in the course of film-formation or other processes, or upon application of high heat to the composite after formation of a coating, and another problem that cracks are considerably caused such as upon formation of a coating on a malleable substrate such as plastics.

DISCLOSURE OF INVENTION

The present invention has been carried out in view of the above problems, and it is therefore an object of the present invention to provide a coating material composite capable of having a lower refractive index and keeping higher antiscratching property, antifouling property, chemical resistance, and anticrack property even when the coating material composite is used to form a coating on a malleable substrate such as plastic substrates and exposed to high temperatures upon formation of the coating and after formation of the coating, and to provide a coated article formed with a coating derived from the coating material composite.

The coating material composite according to the present invention contains: a silane compound represented by the following general formula (A); and an epoxy group-containing organic compound containing one or more epoxy groups in each molecule; wherein the silane compound has a content of 60 to 97% by weight relative to a total amount of resin components; and wherein the epoxy group-containing organic compound has a content of 3 to 10% by weight relative to the total amount of resin components;

$$X_m R^1_{3-m} Si—Y—SiR^1_{3-m} X_m \qquad (A)$$

[$R^1$ is a monovalent hydrocarbon group having a carbon number of 1 to 6; Y is a divalent organic group containing one or more fluorine atoms; X is a hydrolytic group; and m is an integer of 1 to 3].

The coating formed by such a coating material composite is capable of keeping a higher anticrack property even upon exposure to high-temperature.

It is preferable that the epoxy group-containing organic compound contains at least one kind of compound selected from a compound represented by the following general formula (B) and a compound represented by the following general formula (C):

$$R^2_n R^3_p Si Z_{4-(n+p)} \qquad (B)$$

[$R^2$ and $R^3$ are each an organic group having a carbon number of 1 to 16, and at least one of them includes an epoxy group; Z is a hydrolytic group; and, n and p are each an integer from 0 to 2, and $1 \leq n+p \leq 3$];

[Chem. 1]

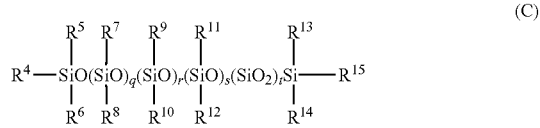

$$R^4—SiO(SiO)_q(SiO)_r(SiO)_s(SiO_2)_t Si—R^{15} \qquad (C)$$

with substituents $R^5, R^7, R^9, R^{11}, R^{13}$ above and $R^6, R^8, R^{10}, R^{12}, R^{14}$ below

[$R^4$ to $R^{15}$ are organic groups, and at least one of them includes an epoxy group; and q, r, s, and t are each an integer of 0 to 12].

Further, it is preferable that the epoxy group-containing organic compound contains two or more epoxy groups in each molecule.

Moreover, it is preferable that the coating material composite further contains a fluorinated alkyl group-containing alkoxysilane represented by the following general formula (D):

$$R_f\text{—}SiX_3 \quad (D)$$

[$R_f$ is a monovalent organic group containing one or more fluorine atoms; and X is a hydrolytic group].

Further, it is preferable that the coating material composite further contains a filler.

It is preferable that the epoxy group-containing organic compound has a content of 3 to 10% by weight relative to the silane compound represented by the general formula (A).

Further, the coated article of the present invention has a surface formed with a cured coating derived from the coating material composite.

BEST MODE FOR CARRYING OUT THE INVENTION

There will be explained a best mode for carrying out the present invention.

The coating material composite according to the present invention contains, as indispensable components, a silane compound represented by the general formula (A), and an epoxy group-containing organic compound containing one or more epoxy groups in each molecule.

$$X_mR^1_{3-m}Si\text{—}Y\text{—}SiR^1_{3-m}X_m \quad (A)$$

[$R_1$ is a monovalent hydrocarbon group having a carbon number of 1 to 6; Y is a divalent organic group containing one or more fluorine atoms; X is a hydrolytic group; and m is an integer of 1 to 3].

Y in the formula (A) is a divalent organic group having one or more fluorine atoms, and the number of fluorine atoms is preferably 4 to 50, and particularly preferably 8 to 24. Particularly, fluorine atoms are to be preferably contained in a larger number, so as to exhibit various properties such as antireflection property, antifouling property, water repellency, and the like at excellent levels, respectively. Further, since a perfluoroalkylene group is rigid, fluorine atoms are also to be preferably contained in a larger number for the purpose of obtaining a coating which has a higher hardness and an excellent antiscratching property. Inclusion of a large number of fluorine atoms leads to a better chemical resistance. Thus, Y is to preferably have the following structure:

—$CH_2CH_2(CF_2)_nCH_2CH_2$

—$C_2H_4$—$CF(CF_3)$—$(CF_2)_n$—$CF(CF_3)$—$C_2H_4$

[n is an integer of 2 to 20].

n in the structure is required to meet a value in a range of 2 to 20, preferably 4 to 12, and particularly preferably 4 to 10. Numbers less than this range may fail to sufficiently obtain various properties such as antireflection property, antifouling property, water repellency and the like, as well as chemical resistance, and numbers more than this range may fail to obtain a sufficient antiscratching property because cross-linking densities are lowered then.

$R^1$ represents a monovalent hydrocarbon group having a carbon number of 1 to 6, and examples thereof concretely include: alkyl groups such as a methyl group, ethyl group, propyl group, butyl group, hexyl group, and cyclohexyl group; a phenyl group; and the like. The methyl group is desirable, for obtaining an excellent antiscratching property.

m is an integer of 1 to 3, and preferably 2 or 3, and particularly preferably, m=3 for obtaining a higher hardness coating.

X represents a hydrolytic group. Concrete examples thereof include a halogen atom such as Cl, and include an organooxy group represented by $OR_X$ ($R_X$ is a monovalent hydrocarbon group having a carbon number of 1 to 6), and particularly: an alkoxy group such as a methoxy group, an ethoxy group, a propoxy group, an isopropoxy group, and a butoxy group; an alkenoxy group such as an isopropenoxy group; an acyloxy group such as an acetoxy group; a ketoxime group such as a methylethylketoxime group; and an alkoxy-alkoxy group such as a methoxy-ethoxy group. Among them, an alkoxy group is desirable, and particularly a methoxy group and an ethoxy group are desirable, since silane compounds including them are easy to handle, and also easy to control a reaction thereof upon hydrolysis.

Concrete examples of such a silane compound represented by the general formula (A) include the following:

[Chem. 2]

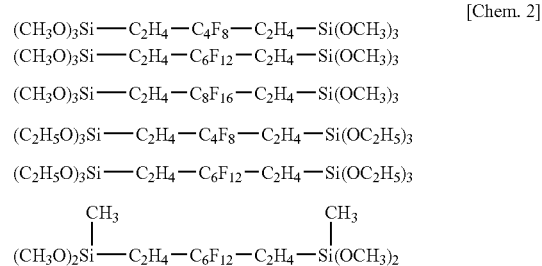

The silane compound represented by the general formula (A) is to be contained in the coating material composite, in a range of 60 to 97% by weight, and preferably 65 to 85% by weight relative to a total amount of resin components. This enables to improve chemical resistance of the coating based on the silane compound represented by the general formula (A), and to improve alkali resistance which has been a problem of a conventional polysiloxane-based coating.

While it is possible to use an appropriate compound as the epoxy group-containing organic compound containing one or more epoxy groups in each molecule, it is desirable to use an epoxy group-containing organic compound containing two or more epoxy groups in each molecule, and it is then possible to further improve chemical resistance of a coating. Such an epoxy group-containing organic compound containing two or more epoxy groups in each molecule, is to be contained in a range of 3 to 10% by weight relative to a total amount of resin components. Amounts less than 3% by weight fail to sufficiently improve anticrack property of a coating, and amounts larger than 10% by weight fail to sufficiently improve chemical resistance of a coating, thereby causing a possibility of deteriorated wear resistance of a coating.

Preferably usable as such an epoxy group-containing organic compound are those selected from a compound represented by the following general formula (B) and a compound represented by the following general formula (C), in a manner to use one kind or multiple kinds of such compounds. In this case, it is possible to further improve anticrack property, without deteriorating chemical resistance and wear resistance of a coating. The total content of the epoxy group-containing organic compound is preferably within a range of 3 to 10% by weight relative to a total amount of resin components, and excessively lower amounts of contents may fail to sufficiently improve anticrack property, while excessively larger amounts of contents may degrade chemical resistance and wear resistance.

$$R^2_nR^3_pSiZ_{4-(n+p)} \quad (B)$$

[$R^2$ and $R^3$ are each an organic group having a carbon number of 1 to 16, and at least one of them includes an epoxy group; Z is a hydrolytic group; and, n and p are each an integer from 0 to 2, and $1 \leq n+p \leq 3$].

[Chem. 3]

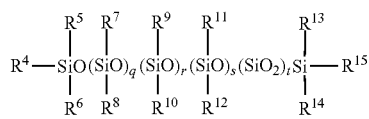

(C)

[$R^4$ to $R^{15}$ are organic groups, and at least one of them includes an epoxy group; and, q, r, s, and t are each an integer of 0 to 12].

The compound represented by the general formula (B) is appropriately selected, depending on purposes such as: adhesive property to a substrate; due hardness and low reflectivity of an obtained coating film; and a lifetime of the composite. Examples thereof include glycidoxymethyl trimethoxysilane, glycidoxymethyl triethoxysilane, α-glycidoxyethyl trimethoxysilane, α-glycidoxyethyl triethoxysilane, β-glycidoxyethyl triethoxysilane, β-glycidoxypropyl trimethoxysilane, α-glycidoxypropyl trimethoxysilane, α-glycidoxypropyl triethoxysilane, β-glycidoxypropyl triethoxysilane, γ-glycidoxypropyl trimethoxysilane, (3,4-epoxycyclohexyl)methyl trimethoxysilane, γ-glycidoxypropyl vinyl diethoxysilane, γ-glycidoxypropyl phenyl diethoxysilane, and δ-(3,4-epoxycyclohexyl)butyl triethoxysilane.

In case of the compound represented by the general formula (C), examples of $R^4$ to $R^{15}$ in the general formula include organic groups including appropriate hydrocarbon groups such as methyl group and the like. Further, at least one of $R^4$ to $R^{15}$ includes an epoxy group, and examples thereof include those having structures represented by the following general formula:

[Chem. 4]

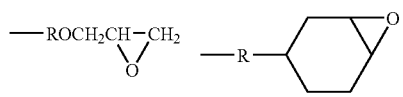

Concrete examples of compounds each represented by the general formula (C) include the following:

[Chem. 5]

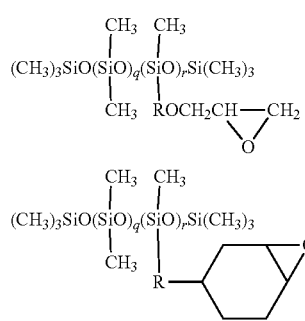

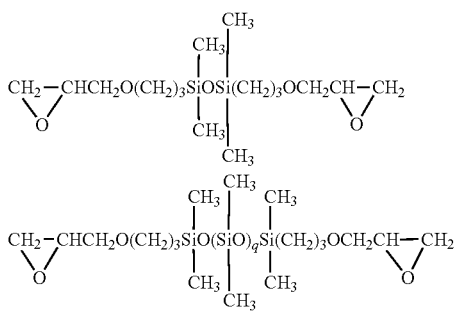

[Chem. 6]

[POA is a polyether group, and preferably $-C_3H_6O(C_2H_4O)_a(C_3H_6O)_bR'$; "a" and "b" are each an integer of 0 to 12; and R' is a hydrocarbon group].

As the epoxy group-containing organic compound, appropriate epoxy compounds are usable, in addition to those represented by the general formulae (B) and (C). Examples of such epoxy compounds include the following:

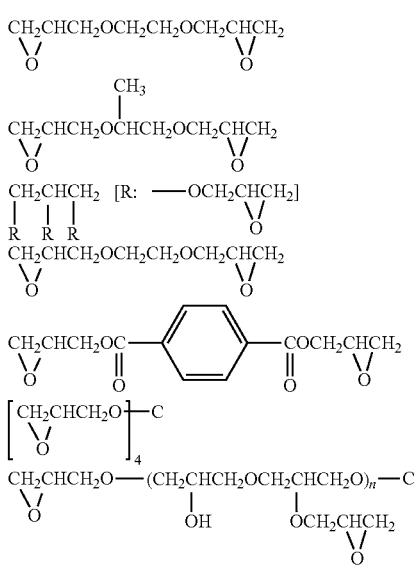

[Chem. 7]

-continued

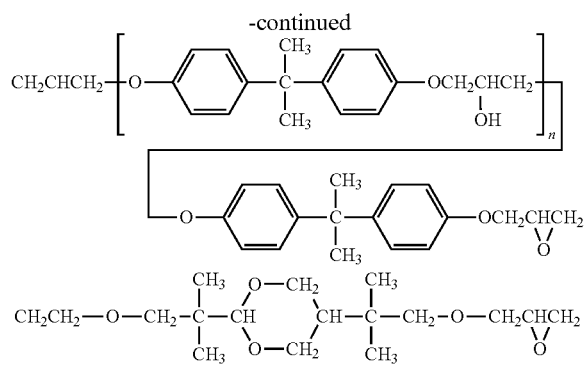

Although the content of the epoxy group-containing organic compound is to be appropriately adjusted, it is desirable to adjust the content within a range of 3 to 10% by weight relative to the silane compound represented by the general formula (A), thereby allowing for a further improved anti-crack property of a coating without deteriorating chemical resistance and wear resistance of the coating. Contents excessively lower than the range make it difficult to sufficiently improve anticrack property, and contents exceeding the range may degrade chemical resistance, wear resistance, and the like.

It is also possible to contain a fluorinated alkyl group-containing alkoxysilane represented by the following general formula (D), in the coating material composite.

[$R_f$ is a monovalent organic group containing one or more fluorine atoms; and X is a hydrolytic group].

Inclusion of such a silane enables to further decrease a refractive index of a formed coating.

In the general formula (D), the number of fluorine atoms in $R_f$ is 3 to 25, and preferably 3 to 17. Particularly,

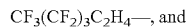

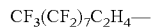

are desirable, since they includes no polar portions.

Further, X as a hydrolytic group may be the same as that in the general formula (A).

Examples of the fluorinated alkyl group-containing alkoxysilane represented by the general formula (D) include the following:

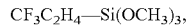

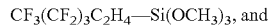

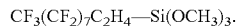

Although the content of the fluorinated alkyl group-containing alkoxysilane represented by the general formula (D) and hydrolyzate (partial hydrolyzate) thereof is to be appropriately adjusted, such a content is preferably within a range of 1 to 30% by weight, and particularly preferably 1 to 10% by weight relative to a total amount of resin components in the composite because excessively large contents deteriorate antiscratching property of a coating.

Further, for the purpose of adjusting physical properties of the coating such as hardness, antiscratching property, and electrical conductivity, it is possible to blend a filler in the coating material composite, such as inorganic oxide fine particles such as silica, aluminum oxide, titanium oxide, zinc oxide, zirconium oxide, cerium oxide, tin oxide, indium oxide, or complex oxides thereof, or hollow sol thereof. Among them, it is desirable to use colloidal silica, hollow silica sol, when the coating is desired to be kept low in refractive index. Preferable inorganic fine particles desirably have an averaged primary particle diameter of 0.001 to 0.1 μm, and more preferably 0.001 to 0.05 μm. Averaged primary particle diameters exceeding 0.1 μm tend to decrease transparency of a cured coating formed of the adjusted composite. It is possible to use those inorganic oxide fine particles which have surfaces treated with organo-metallic compound such as a silane-based, titanium-based, aluminum-based, or zirconium-based coupling agent.

As the filler, it is also possible to blend hollow fine particles each having an outer envelope formed of metal oxide. Usable as such hollow fine particles are hollow silica fine particles. Hollow silica fine particles have outer envelopes formed with interior cavities therein, respectively, and without particularly limited thereto, the following are usable. For example, it is possible to use hollow silica fine particles each comprising an outer envelope (shell) made of silica-based inorganic oxide formed with an interior cavity. The silica-based inorganic oxide embraces: (A) a single layer of silica; (B) a single layer of a complex oxide of silica and inorganic oxide other than silica; and (C) double layers of the layer (A) and layer (B). Outer envelopes may be porous substances having pores, or may have pores therein occluded by an operation to be described later so as to hermetically seal interior cavities. The outer envelopes are each desirably a silica-based multiplex coating layer comprising a first inner silica coating layer and a second outer silica coating layer. Providing the second outer silica coating layer exemplarily enables to occlude fine pores of the outer envelope to thereby densify the outer envelope, and to obtain hollow silica fine particles having interior cavities hermetically sealed by outer envelopes, respectively.

The thickness of a first silica coating layer is preferably within a range of 1 to 50 nm, and particularly preferably 5 to 20 nm. Thicknesses of a first silica coating layer less than 1 nm make it difficult to maintain a particle shape, to thereby possibly fail to obtain a hollow silica fine particle, and to thereby complicate removal of component substances of a nucleus particle because partial hydrolyzate and the like of an organosilicon compound enters pores of the nucleus particle upon formation of a second silica coating layer. Contrary, thicknesses of a first silica coating layer exceeding 50 nm decrease a ratio of a cavity in a hollow silica fine particle, to thereby possibly cause a refractive index to be insufficiently decreased. Further, thicknesses of outer envelopes are preferably within a range of 1/50 to 1/5 of an averaged particle diameter. It is enough to make a second silica coating layer such that a sum of the thicknesses of the second silica coating layer and the first silica coating layer is within the above range of 1 to 50 nm, and particularly within a range of 20 to 49 nm for densified outer envelopes.

Present in a cavity of each hollow silica fine particle is at least one of a solvent used upon preparation of the fine particle, and a gas entered upon drying. The cavity may contain a precursor substance, which has been used for forming the cavity and is left therein. The precursor substance may be left in a small amount by attaching to an associated outer envelope, or may occupy most of the interior of the cavity. Here, the precursor substance means a porous substance left after removing part of component substances of a nucleus particle used for forming a first silica coating layer. As a nucleus particle, there is used a porous complex oxide particle comprising silica, and inorganic oxide other than silica. Examples of the inorganic oxide include one kind or two or more kinds of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, and the like. Examples of two or more kinds of inorganic oxides include $TiO_2$—$Al_2O_3$, $TiO_2$—$ZrO_2$, and the like. Note that the solvent or gas is also present in pores of the porous substance. Removing larger amounts of component substances at this time increase volume of cavities to enable obtainment of hollow silica fine particles having lower refractive indexes, such that a transparent coating obtained by blending the hollow silica fine particles has a lower refractive index and is excellent in antireflection performance.

The coating material composite according to the present invention can be prepared by blending the above-mentioned matrix forming material with hollow fine particles. Although the weight ratio between hollow fine particles and other components in the coating material composite is not particularly limited, the weight ratio is to be preferably set at such a range that (hollow fine particles)/(other components (solid contents))=80/20 to 10/90, more preferably 50/50 to 15/85. Percentages of hollow fine particles more than 80 lead to a possibility to lower a mechanical strength of a cured coating obtained from the coating material composite, and percentages of hollow fine particles less than 10 rather lead to a possibility to lower an effect of exhibiting a lower refractive index of a cured coating.

Meanwhile, it is possible to add, into the coating material composite, silica particles which do not have hollow interior cavities in outer envelopes, respectively. Blending such silica particles enables improvement of a mechanical strength of a cured coating formed from the coating material composite, and enables improvement of surface smoothness and anticrack property. Such silica particles are not particularly limited in terms of form, and may be in a powder form or a sol form. When silica particles are to be used in a sol form, i.e., used as colloidal silica, it is possible to exemplarily use a water dispersible colloidal silica, or a colloidal silica dispersible in a hydrophilic organic solvent such as alcohol and the like, without particularly limited thereto. Generally, such a colloidal silica contains 20 to 50% by mass of silica as a solid content, and this value enables determination of a blending amount of silica. The adding amount of silica particles is preferably 0.1 to 30% by mass relative to a total amount of solid contents in the coating material composite. Adding amounts less than 0.1% by mass lead to a possibility to fail to obtain an effect by virtue of addition of the silica particles, and adding amounts exceeding 30% by mass lead to a possibility to cause an adverse effect to increase a refractive index of a cured coating.

Inclusion of a filler in the above manner allows for expectation of further improvement of wear resistance of a coating film, and particularly, further lowered refractive indexes can be expected by addition of a filler having lower refractive index such as magnesium fluoride having a lower refractive index, and hollow particles and the like.

Examples of other organosilicon compounds combinedly usable together with the above components, include a dialkylsiloxy-based hydrolytic organosilane represented by the following general formula:

[Chem. 8]

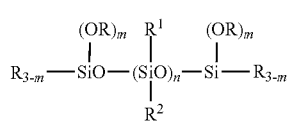

[$R^1$, $R^2$, and R are each an alkyl group; m is an integer of 1 to 3; and n is an integer of 2 to 200].

Examples of such a dialkylsiloxy-based hydrolytic organosilane include those having structures as follows:

[Chem. 9]

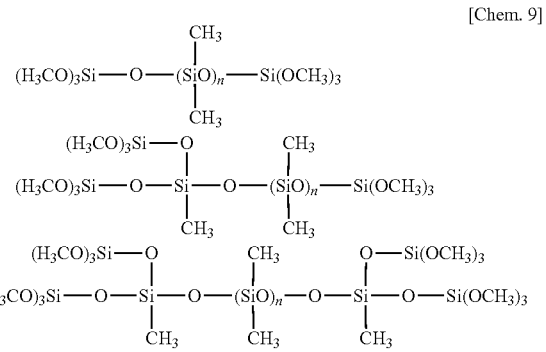

Examples of other organosilicon compounds in addition to the above, include various compounds like: silicates such as tetraethoxysilane; alkylsilanes such as methyl trimethoxysilane, hexyl trimethoxysilane, and decyl trimethoxysilane; phenylsilanes such as phenyl trimethoxysilane; silane coupling agents such as γ-aminopropyl triethoxysilane, γ-methacryloxypropyl trimethoxysilane, and γ-mercaptopropyl trimethoxysilane.

These organosilicon compounds are desirably made to be 30% by weight or less relative to a total amount of resin components. Excessive contents of them lead to a possibility to deteriorate anticrack property of a coating, or to increase a hydrophilicity of a coating to thereby deteriorate chemical resistance thereof.

The compounds represented by the formulae (A), (B), and (D), and the other combinedly usable organosilicon compound may be used as they are, or may be each used in a (partially) hydrolyzed form or in a hydrolyzed form in the following solvent. Particularly, it is desirable to use them in (partially) hydrolyzed forms, from a standpoint of increasing a curing rate after coating. In case of conducting hydrolysis, the hydrolysis is to be preferably conducted such that the molar ratio of water involved in hydrolysis to the hydrolytic group is within a range of 0.1 to 10.

Conventionally known methods are usable for hydrolysis. Examples of a catalyst for hydrolysis or a catalyst for hydrolysis, condensation, and curing, which may be used solely or mixedly, include: acids such as hydrochloric acid, acetic acid, and maleic acid; bases including sodium hydroxide (NaOH), ammonia, amine compounds and salts of amine compounds such as triethylamine, dibutylamine, hexylamine, octylamine, and quaternary ammonium salts such as benzyltriethylammonium chloride, tetramethylammonium hydroxide; fluoride salt such as potassium fluoride, sodium fluoride; solid acidic catalyst or solid basic catalyst (ion-exchange resin catalyst, and the like); metal salts of organo-carboxylic acid such as iron-2-ethyl hexoate, titanium naphthate, zinc stearate, dibutyl tin diacetate; organometallic compounds like organic titanium esters such as tetrabutoxytitanium, tetra-i-propoxytitanium, dibutoxy-(bis-2,4-pentanedionate)titanium, and di-i-propoxy(bis-2,4-pentanedionate)titanium, organic zirconium esters such as tetrabutoxyzirconium, tetra-i-propoxyzirconium, dibutoxy-(bis-2,4-pentanedionate)zirconium, and di-i-propoxy(bis-2,4-pentanedionate)zirconium, alkoxyaluminum compounds such as aluminum triisopropoxide, aluminum chelate compounds such as aluminum acetylacetonate complex; and aminoalkyl substituted alkoxysilanes such as γ-aminopropyl trimethoxysilane, γ-aminopropyl triethoxysilane, N-(β-aminoethyl)-γ-aminopropyl trimethoxysilane, and N-(β-aminoethyl)-γ-aminopropyl triethoxysilane.

The adding amount of the catalyst is 0.01 to 10 parts by weight, preferably 0.1 to 1 parts by weight, relative to 100 parts by weight of a compound to be (partially) hydrolyzed. Amounts less than 0.01 parts by weight may lead to an excessively long time period for completion of reaction, or failure of progress of reaction. Amounts exceeding 10 parts by weight is disadvantageous in terms of cost, or may lead to coloration of an obtained composite or cured substance, or lead to increased side reactions.

The composite of the present invention is usable by diluting it with a solvent. Examples of the solvent include: alcohols such as methanol, ethanol, propyl alcohol, isopropyl alcohol, n-butyl alcohol, isobutyl alcohol, sec-butyl alcohol, tert-butyl alcohol, and diacetone alcohol; glycol ethers such as ethylene glycol monomethyl ether, ethylene glycol monoethyl ether, propylene glycol monomethyl ether, and propylene glycol monoethyl ether; ketones such as acetone, methyl ethyl ketone, methyl isobutyl ketone, and acetyl acetone; esters such as ethyl acetate, butyl acetate, ethyl acetoacetate; and xylene and toluene. Although adding amounts of solvents are arbitrary, the content of a solvent in the composite is preferably 50 to 99% by weight, and particularly preferably 70 to 98% by weight.

Then, the coating material composite prepared in the above manner is coated onto a surface of a substrate to form a coating, and this coating is subsequently dried and cured, to allow for obtainment of a coated article having a surface formed thereon with the cured coating having a lower refractive index.

Although substrates to be coated with the coating material composite are not particularly limited, examples thereof include inorganic substrates represented by glass, metal substrates, and organic substrates represented by acrylic resin, polycarbonate, and polyethylene terephthalate, and examples of shapes of substrates include plate-like shapes, and film-like shapes. It is not a matter that a substrate has a surface formed thereon with one or more layers.

Although methods for coating the coating material composite onto a surface of a substrate are not particularly limited, it is possible to adopt typical and various coating methods such as brush coating, spray coating, immersing coating (dipping, dip coating), roll coating, flow coating, curtain coating, knife coating, spin coating, table coating, sheet coating, leaf coating, die coating, and bar coating.

Although the thickness of the cured coating to be formed on a surface of a substrate can be appropriately selected depending on usages, purposes, and the like, the coating thickness is desirably within a range of 50 to 150 nm, without particularly limited thereto. Here, the product of a refractive index of a cured coating and a coating thickness thereof is an optical coating thickness, and the optical coating thickness of the cured coating is required to be set at (1/4)) so as to attain a minimum reflectivity of light having a wavelength of B. Then, so as to attain a minimum reflectivity of light having a wavelength of λ=540 nm as a target of anti-reflection, the thickness of the cured coating is required to be 100 nm when the cured coating has a refractive index of 1.35 (optical coating thickness=1.35×100=135(1/4)λ). Alternatively, the thickness of the cured coating is required to be 95 nm when the cured coating has a refractive index of 1.42 (optical coating thickness=1.42×95=134.9(1/4)λ). In this way, the thickness of the cured coating is desirably within a range of 50 to 150 nm, in case of optically designing the cured coating as an antireflective coating.

In this respect, it is possible to readily form a cured coating having a lower refractive index which is desirable for antireflective application, by adopting the coating material composite according to the present invention. For example, in case of a substrate having a refractive index of 1.60 or less, it is effective to form a cured coating as an intermediate layer having a refractive index of 1.60 or more on the surface of the substrate, and to form a cured coating based on the coating material composite according to the present invention on the surface of the intermediate layer. The cured coating for forming the intermediate layer can be formed by adopting a known high refractive index material. Further, when the refractive index of the intermediate layer is 1.60 or more, the difference between it and the refractive index of the cured coating based on the coating material composite according to the present invention is increased, thereby enabling obtainment of an antireflective substrate having an excellent antireflection performance. Meanwhile, in order to mitigate coloration of the cured coating of the antireflective substrate, the intermediate layer may be constituted of multiple layers having different refractive indexes, respectively. Examples of antireflective applications include: an antireflective film; an outermost surface of a display; a sideview mirror, and inner surfaces of a front glass, side glass, and rear glass of a vehicle; other vehicular glasses; and glasses for building.

Further, the coating derived from the coating material composite according to the present invention also has higher antiscratching property, antifouling property, chemical resistance, and anticrack property, and these performances, particularly the higher anticrack property can be satisfactorily kept even upon exposure to high temperatures upon formation of the coating and after formation of the coating, thereby enabling formation of a coating which is scarcely subjected to occurrence of cracks upon heating even when the coating is formed on a malleable substrate such as a plastic substrate and the like.

EXAMPLES

The present invention will be concretely described with respect to Examples. Unless otherwise stated, "part(s)" represent(s) "part(s) by mass (part(s) by weight)", and "%" always represents "% by mass" except for reflectivity to be described later. Further, "solid contents" will be always represented by values calculated as oxides, respectively.

Example 1

312.4 parts of methanol was added to 47.8 parts (0.08 mol) of silane compound represented by the following formula (1), and 4.7 parts (0.02 mol) of γ-glycidoxypropyl trimethoxysilane as an epoxy group-containing organic compound and 36 parts of aqueous solution of 0.1N (0.1 mol/L) hydrochloric acid were further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 935 parts of propyleneglycol monomethyl ether thereto, to obtain a coating material composite having a solid content of 3%.

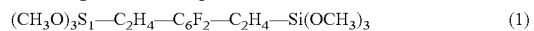

$(CH_3O)_3Si—C_2H_4—C_6F_4—C_2H_4—Si(OCH_3)_3$ (1)

Example 2

317.1 parts of methanol was added to 47.8 parts (0.08 mol) of silane compound represented by the above formula (1), and 3.65 parts (0.01 mol) of siloxane oligomer represented by the following formula (2) as an epoxy group-containing organic compound and 36 parts of aqueous solution of 0.1N (0.1 mol/L) hydrochloric acid were further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 1028 parts of propyleneglycol monomethyl ether thereto, to obtain a coating material composite having a solid content of 3%.

[Chem. 10]

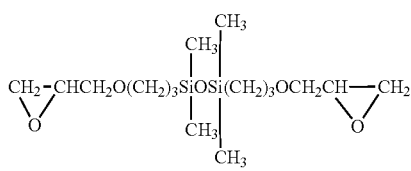

(2)

Example 3

315.3 parts of methanol was added to 47.8 parts (0.08 mol) of silane compound represented by the above formula (1), and 3.5 parts (0.02 mol) of epoxy compound represented by the following formula (3) as an epoxy group-containing organic compound and 36 parts of aqueous solution of 0.1N (0.1 mol/L) hydrochloric acid were further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 939.3 parts of propyleneglycol monomethyl ether thereto, to obtain a coating material composite having a solid content of 3%.

[Chem. 11]

(3)

Example 4

109.2 parts of methanol was added to 21.8 parts (0.10 mol) of fluorinated alkyl group-containing alkoxysilane represented by the following formula (4), and 18 parts of aqueous solution of 0.1N (0.1 mol/L) hydrochloric acid was further added, followed by sufficient mixing to obtain a mixture solution. The mixture solution was stirred for 24 hours in a constant temperature bath kept at 25° C., thereby obtaining a silicone resin having a solid content of 10%. 10 parts of this silicone resin and 90 parts of the silicone resin obtained in Example 2 were mixed with each other, and the mixture was diluted by adding 233.3 parts of propyleneglycol monomethyl ether thereto, to obtain a coating material composite having a solid content of 3%.

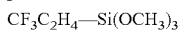

$CF_3C_2H_4$—$Si(OCH_3)_3$ (4)

Example 5

37.3 parts of methanol was added to 20.8 parts (0.10 mol) of tetraethoxysilane, and 1.8 parts of aqueous solution of 0.1N (0.1 mol/L) hydrochloric acid was further added, followed by sufficient mixing to obtain a mixture solution. The mixture solution was stirred for 2 hours in a constant temperature bath kept at 25° C., thereby obtaining a silicone resin having a solid content of 10%. 10 parts of this silicone resin and 90 parts of the silicone resin obtained in Example 2 were mixed with each other, and the mixture was diluted by adding 233.3 parts of propyleneglycol monomethyl ether thereto, to obtain a coating material composite having a solid content of 3%.

Example 6

As hollow silica fine particles, there was adopted a hollow silica IPA (isopropanol) dispersion sol (solid content of 20%, averaged primary particle diameter of 60 nm, outer envelope thickness of about 10 nm, produced by Catalysts & Chemicals Industries Co., Ltd.), which was diluted with methanol down to a solid content of 10%, thereby obtaining a dispersion sol. 10 parts of this dispersion sol and 90 parts of the silicone resin obtained in Example 2 were mixed with each other, and the mixture was diluted by adding 233.3 parts of propyleneglycol monomethyl ether thereto, to obtain a coating material composite having a solid content of 3%.

Comparative Example 1

364.1 parts of methanol was added to 598 parts (0.10 mol) of silane compound represented by the above formula (1), and 36 parts of aqueous solution of 0.1N (0.1 mol/L) hydrochloric acid was further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 1073.1 parts of propyleneglycol monomethyl ether thereto, to obtain a coating material composite having a solid content of 3%.

Comparative Example 2

320.1 parts of methanol was added to 23.9 parts (0.04 mol) of silane compound represented by the above formula (1), and 21.8 parts (0.06 mol) of siloxane oligomer represented by the above formula (2) and 36 parts of aqueous solution of 0.1N (0.1 mol/L) hydrochloric acid were further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 937.5 parts of propyleneglycol monomethyl ether thereto, to obtain a coating material composite having a solid content of 3%.

Comparative Example 3

50 parts of the silicone resin obtained in Example 4 and 50 parts of the silicone resin obtained in Example 2 were mixed with each other, and the mixtures was diluted by adding 233.3 parts of propyleneglycol monomethyl ether thereto, to obtain a coating material composite having a solid content of 3%.

Comparative Example 4

50 parts of the silicone resin obtained in Example 5 and 50 parts of the silicone resin obtained in Example 2 were mixed with each other, and the mixtures was diluted by adding 233.3 parts of propyleneglycol monomethyl ether thereto, to obtain a coating material composite having a solid content of 3%.

Comparative Example 5

341.7 parts of methanol was added to 41.8 parts (0.07 mol) of the silane compound represented by the above formula (1), and 10.9 parts (0.03 mol) of the siloxane oligomer represented by the above formula (2) and 36 parts of aqueous solution of 0.1N (0.1 mol/L) hydrochloric acid were further added, followed by sufficient mixing to obtain a mixture solution. The mixture solution was stirred for 2 hours in a constant temperature bath kept at 25° C., thereby obtaining a silicone resin having a solid content of 10%. This solution was diluted by adding 1004.4 parts of propyleneglycol monomethyl ether thereto, to obtain a coating material composite having a solid content of 3%.

(Composition)

Blending ratios (% by mass) of the coating material composites in the Examples and Comparative Examples are listed in Table 1.

TABLE 1

|  | Compound represented by formula (1) | Epoxy group-containing organic compound | Other resin component | Filler | a | b |
|---|---|---|---|---|---|---|
| Ex. 1 | 4.78 | 0.47 | 0 | 0 | 91.0% | 9.0% |
| Ex. 2 | 4.78 | 0.365 | 0 | 0 | 92.9% | 7.1% |
| Ex. 3 | 4.78 | 0.35 | 0 | 0 | 93.2% | 6.8% |
| Ex. 4 | 10.63 | 0.82 | 1.46 | 0 | 82.3% | 6.4% |
| Ex. 5 | 10.63 | 0.82 | 3.47 | 0 | 71.2% | 5.5% |
| Ex. 6 | 10.63 | 0.82 | 0 | 1 | 92.8% | 7.2% |
| Com. Ex. 1 | 1 | 0 | 0 | 0 | 100.0% | 0.0% |
| Com. Ex. 2 | 2.39 | 2.18 | 0 | 0 | 52.3% | 47.7% |
| Com. Ex. 3 | 5.91 | 0.46 | 7.32 | 0 | 43.2% | 3.4% |
| Com. Ex. 4 | 5.91 | 0.46 | 17.36 | 0 | 24.9% | 1.9% |
| Com. Ex. 5 | 4.18 | 1.09 | 0 | 0 | 79.3% | 20.7% | a: content of silane compound represented by formula (A)
b: content of epoxy group-containing organic compound (Formation of Coating)

Coating material composites obtained in Examples and Comparative Examples were each left still for 1 hour, and were each coated by a wire bar coater onto a hard-coat surface of an acrylic plate (double-side hard-coated "Delaglass TMHA", produced by Asahi KASEI Corporation; refractive index of hard-coat=1.52) which had been previously surface washed by a UV-ozone washer (excimer lamp of "Type H0011" manufactured by USHIO INC.) in a manner to obtain a coating thickness of about 100 nm for the pertinent coating material composite, followed by treatment at 100° C. for 30 minutes, thereby obtaining cured coatings, respectively.

Conducted for the cured coatings were evaluation tests concerning minimum reflectivity, wear resistance, fingerprint removability, alkali resistance, and anticrack property, as follows.

(Minimum Reflectivity)

There was measured a 50 relative minimum reflectivity, by a spectrophotometer ("U-4100" manufactured by Hitachi, Ltd.).

(Wear Resistance)

Scratching was applied onto a surface of each cured coating by a wear tester ("HEIDON-14DR", steel wool #0000 manufactured by SHINTO SCIENTIFIC Co., Ltd., load of 9.8 kPa (100 g/cm$^2$)), in a manner to observe a scratch level caused in the cured coating, thereby judging a mechanical strength thereof based on the following evaluation criterion.

A: No scratches were caused.
B: Scratches were slightly caused.
C: Scratches were caused.
D: Many scratches were caused (or peeling was caused).

(Fingerprint Removability)

Left on a surface of each cured coating was a fingerprint, followed by observation of a state after wiping off the fingerprint by an OA Toraysee (made by Toray Industries), to judge a fingerprint removability based on the following evaluation criterion.

A: Removable by wiping several times.
B: Removable by wiping ten and several times.
C: Narrowly removable by wiping many times.
D: Unremovable (prints were left).

(Alkali Resistance)

There was observed a state of each cured coating after immersing the coating in an aqueous solution of 0.1N (0.1 mol/L) sodium hydroxide at 25° C. for 1 hour, to evaluate alkali resistance based on the following evaluation criterion.

A: Coating was unchanged.
B: Although traces of immersion were left on the coating, peeling abnormality was not caused even by rubbing the coating by a cloth.
C: Although peeling was not caused by immersion only, peeling was caused by rubbing by a cloth.
D: Peeling was caused by immersion.

(Anticrack Property)

There was fired an acrylic plate formed with an applicable coating at 110° C. for 30 minutes, subsequently at 120° C. for 30 minutes, and further at 130° C. for 30 minutes, to evaluate anticrack property at a firing temperature at which cracks were caused in the coating.

A: Cracks were not caused even at 130° C.
B: Cracks were caused at 130° C.
C: Cracks were caused at 120° C.
D: Cracks were caused at 110° C.

The above results are listed in Table 2.

TABLE 2

|  | Minimum Reflectivity (%) | Wear Resistance | Fingerprint Rmovability | Alkali Resistance | Anticrack Property |
|---|---|---|---|---|---|
| Ex. 1 | 2.0 | A | A | A | A |
| Ex. 2 | 1.6 | A | A | A | A |
| Ex. 3 | 1.9 | A | A | A | A |
| Ex. 4 | 1.5 | A | A | B | A |
| Ex. 5 | 1.5 | A | A | A | B |
| Ex. 6 | 1.4 | A | A | A | A |
| Com. Ex. 1 | 1.9 | A | A | A | C |
| Com. Ex. 2 | 2.3 | C | C | C | A |
| Com. Ex. 3 | 1.4 | A | A | C | C |
| Com. Ex. 4 | 1.9 | A | A | D | D |
| Com. Ex. 5 | 2.0 | B | C | B | A |

As seen from the results, although Examples 1 through 6 have all "A" evaluations or partly "B" evaluations, none of Comparative Examples has all "B" evaluations or more excellent evaluation, thereby clarifying that the coating material composites of the present invention are capable of realizing lower reflectivities, higher wear resistance, fingerprint wiping-off ability, alkali resistance, and anticrack property.

INDUSTRIAL APPLICABILITY

The present invention is applicable to: a coating material composite which has a lower refractive index and is capable of keeping higher antiscratching property, antifouling property, chemical resistance, and anticrack property even when the coating material composite is used to form a coating on a malleable substrate such as plastic substrates and exposed to high temperatures upon formation of the coating and after formation of the coating; and a coated article formed with a coating derived from the coating material composite.

According to the present invention, it becomes possible to form a coating having higher antireflection property, antiscratching property, antifouling property, chemical resistance, and anticrack property, and these performance, particularly the higher anticrack property can be kept even upon exposure to high temperatures.

The invention claimed is:

1. A coating material composite, comprising:
a silane compound represented by the following general formula (A); and
an epoxy group-containing organic compound containing one or more epoxy groups in each molecule;
wherein the silane compound has a content of 60 to 93.2% by weight relative to a total amount of resin components; and
wherein the epoxy group-containing organic compound has a content of 6.8 to 10% by weight relative to the total weight of resinifiable components;

$$X_m R^1{}_{3-m}Si-Y-SiR^1{}_{3-m}X_m \quad (A)$$

wherein $R_1$ is a monovalent hydrocarbon group having a carbon number of 1 to 6; Y is a divalent organic group containing one or more fluorine atoms; X is a hydrolytic group; and m is an integer of 1 to 3.

2. The coating material composite as claimed in claim 1, wherein the epoxy group-containing organic compound comprises at least one compound selected from a compound represented by the following general formula (B) and a compound represented by the following general formula (C):

$$R^2{}_n R^3{}_p SiZ_{4-(n+p)} \quad (B)$$

wherein $R^2$ and $R^3$ are each an organic group having a carbon number of 1 to 16, and at least one of them includes an epoxy group; Z is a hydrolytic group; and, n and p are each an integer from 0 to 2, and $1 \leq n+p \leq 3$;

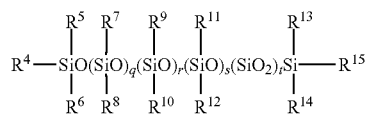

wherein $R^4$ to $R^{15}$ are organic groups, one or two of them includes an epoxy group; and, q, r, s, and t are each an integer of 0 to 12.

3. The coating material composite as claimed in claim 1, wherein the epoxy group-containing organic compound contains two epoxy groups in each molecule.

4. The coating material composite as claimed in claim 1, further comprising: a fluorinated alkyl group-containing alkoxysilane represented by the following general formula (D):

$$R_f-SiX_3 \quad (D)$$

wherein $R_f$ is a monovalent organic group containing one or more fluorine atoms; and X is a hydrolytic group.

5. The coating material composite as claimed in claim 1, further comprising: a filler.

6. The coating material composite as claimed in claim 1, wherein the epoxy group-containing organic compound has a content of 6.8 to 10% by weight relative to the silane compound represented by the general formula (A).

7. A coated article having a surface formed with a cured coating derived from the coating material composite as claimed in claim 1.

8. The coating material composite as claimed in claim 1, wherein the epoxy group-containing organic compound comprises a compound represented by the following general formula (C):

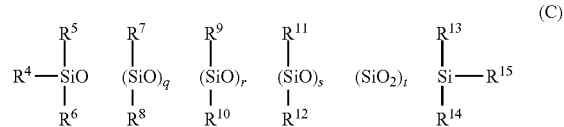

wherein $R^4$ to $R^{15}$ are organic groups, and one or two of them includes an epoxy group; and, q, r, s, and t are each an integer of 0 to 12.

* * * * *